United States Patent
Kapinos et al.

(10) Patent No.: US 12,547,691 B2
(45) Date of Patent: Feb. 10, 2026

(54) LIVENESS DETECTION FOR AUTHENTICATION

(71) Applicant: Lenovo (Singapore) Pte. Ltd., Singapore (SG)

(72) Inventors: Robert J. Kapinos, Durham, NC (US); Scott Li, Cary, NC (US); Robert James Norton, Jr., Raleigh, NC (US); Russell S. VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 111 days.

(21) Appl. No.: 18/544,152

(22) Filed: Dec. 18, 2023

(65) Prior Publication Data

US 2025/0200155 A1   Jun. 19, 2025

(51) Int. Cl.
*G06F 21/32* (2013.01)

(52) U.S. Cl.
CPC .................. *G06F 21/32* (2013.01)

(58) Field of Classification Search
CPC ...................................... G06F 21/32
See application file for complete search history.

(56) References Cited

U.S. PATENT DOCUMENTS

| | | | |
|---|---|---|---|
| 8,306,265 B2 * | 11/2012 | Fry | G08B 13/19697 348/169 |
| 2017/0056748 A1 * | 3/2017 | Crawford | A63B 71/0605 |

\* cited by examiner

*Primary Examiner* — Azizul Choudhury
(74) *Attorney, Agent, or Firm* — FERENCE & ASSOCIATES LLC

(57) ABSTRACT

One embodiment provides a method, the method including: transmitting, to a component of a liveness detection system, an electrical signal; detecting, using a detection component of the liveness detection system, an electric field created by contact with the component; determining, using the liveness detection system, that the electric field corresponds to an electric field signature of a user; and authenticating, based upon the determining, the user. Other aspects are claimed and described.

20 Claims, 3 Drawing Sheets

LIVENESS DETECTION FOR AUTHENTICATION

BACKGROUND

Information is very important to entities (e.g., businesses, governments, individual users, etc.) and, as such, many entities take steps to protect the information from other users or entities gaining access to it. Specifically, many entities protect the information with varying levels of authentication access. Authentication access is very easy to set up and can allow an entity to only provide access to information to people or other entities based upon the level of access the originating entity wants to allow. Authentication access can simply require the provision of user credentials, or may be more complex and have multiple different requirements, such as biometric information, access being allowed in a particular location, access requirements that change over time, continuous authentication requirements, and/or the like.

BRIEF SUMMARY

In summary, one aspect provides a method, the method including: transmitting, to a component of a liveness detection system, an electrical signal; detecting, using a detection component of the liveness detection system, an electric field created by contact with the component; determining, using the liveness detection system, that the electric field corresponds to an electric field signature of a user; and authenticating, based upon the determining, the user.

Another aspect provides a system, the system including: a processor; a memory device that stores instructions that, when executed by the processor, causes the system to: transmit, to a component of a liveness detection system, an electrical signal; detect, using the detection component of the liveness detection system, an electric field created by contact with the component; determine, using the liveness detection system, that the electric field corresponds to an electric field signature of the user; and authenticate, based upon the determining, the user.

A further aspect provides a product, the product including: a computer-readable storage device that stores executable code that, when executed by a processor, causes the product to: transmit, to a component of a liveness detection system, an electrical signal; detect, using a detection component of the liveness detection system, an electric field created by contact with the component; determine, using the liveness detection system, that the electric field corresponds to an electric field signature of a user; and authenticate, based upon the determining, the user.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
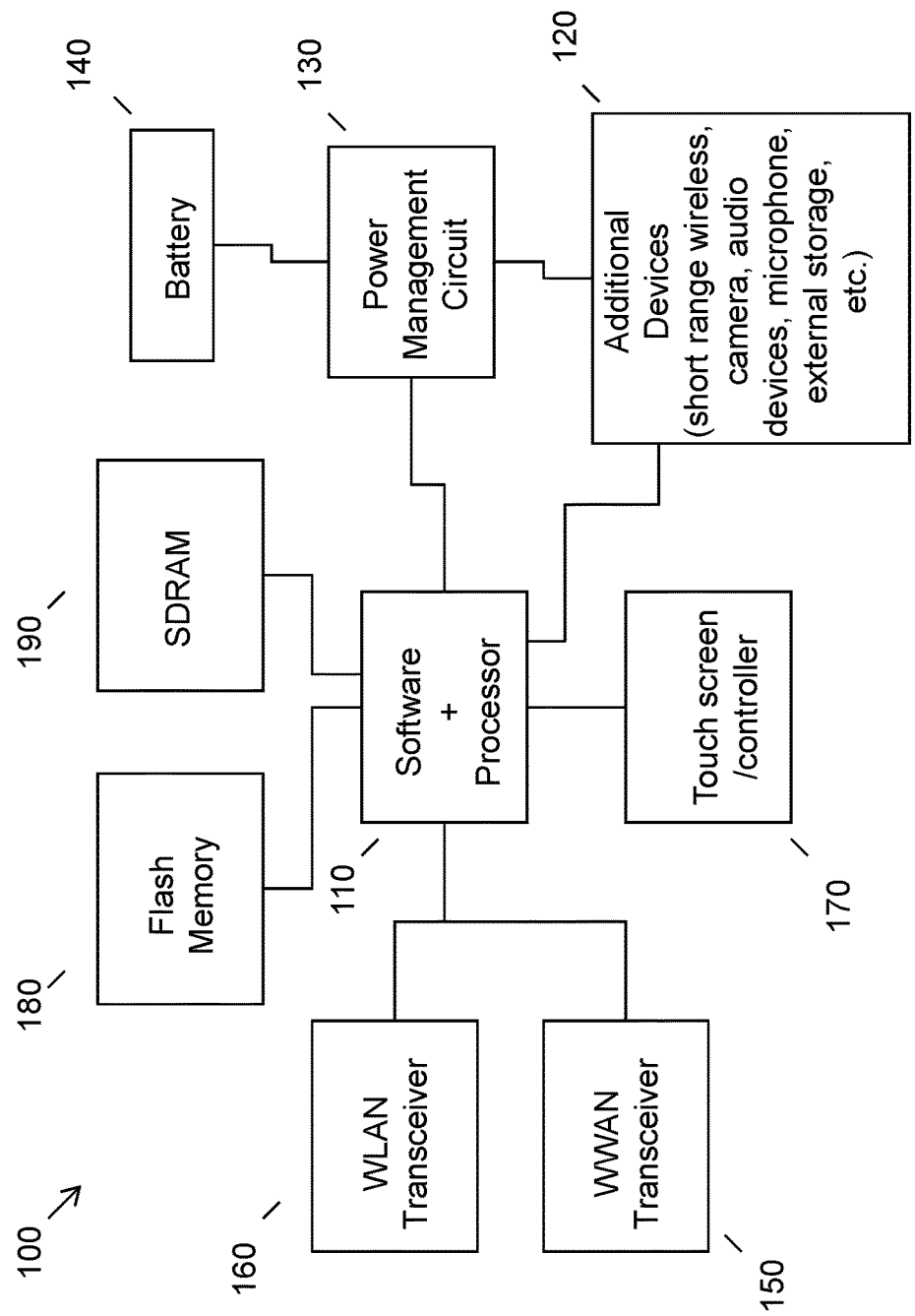
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Depending on how secure an entity wants to keep information, the entity may establish different levels of authentication. One type of authentication is a one-time authentication, where a user or entity is authenticated at the beginning of an authentication session and is thereafter authenticated for access to the information until the authenticated session is terminated, for example, via a time-out, via a user or entity logging off the authenticated session, and/or the like. Another type of authentication is a periodic authentication, where a user or entity has to periodically provide authentication information throughout an authenticated session. For example, the user may have to provide authentication information at the beginning of the authenticated session and then every fifteen minutes thereafter. Another type of authentication is a continuous authentication, where the user is frequently authenticated during an authentication session. For example, once the authentication session is established, a user may be authenticated every few minutes. A combination of authentication types may also be used. Additionally, even if the user has established an authentication session, the user may have to provide additional authentication information if the user wants to access information having stricter authentication requirements than the current authentication session.

Continuous authentication sessions are generally used when the information being accessed needs a high level of security, because such an authentication session is the most invasive to the user. Since the user has to provide authentication information so frequently in a continuous authentication session, generally the authentication information required after the authentication session has been established is less obtrusive than the authentication information required to establish the authentication session. For example, the authentication information required to establish the authentication session may be biometric information and user credentials, whereas the authentication information required to maintain the authenticated session is proof of liveness. This proof of liveness is referred to as liveness detection.

Liveness detection generally uses a technique to determine that an actual person is the one who is accessing the authenticated session. Liveness detection can have varying degrees of requirements. Some liveness detection techniques simply rely on a camera or other image capture device to detect particular biometric information of the user (e.g., retina scan, image, etc.). However, these can be easily fooled by pictures or videos of the biometric data. Other liveness detection techniques provide instructions to a user and then determine whether the user has followed the instructions. For example, the system may ask the user to turn their head towards a sound emanating from a speaker or other source controllable by the system. However, these techniques are vulnerable to reply attacks. Other liveness detection techniques rely on three-dimensional depth imaging, but this requires expensive software and hardware to implement and can be fooled by artificial intelligence models. Another liveness detection technique may involve secrets, but this requires a second input terminal and may additionally require access to secondary sources of the user.

Accordingly, the described system and method provides a technique for authenticating a user based on a detected electric field of the user using a liveness detection system. The liveness detection system includes a component that may transmit an electrical signal to a user when the user makes contact with the component, thereby causing a change in an electric field of the user. For example, providing a charge to the user via an electrical signal will increase the electric field of a user. The liveness detection system can utilize an electric field sensor to determine if a detected electric field corresponds to an electric field signature of the user. When it is determined that the electric field does correspond to a signature of the user, the liveness detection system may authenticate a user, thereby allowing access to information secured behind the authentication requirement or allowing continued access during an authenticated session. Thus, authenticating the user may permit access to data with a required security and/or secure locations, may permit the execution and/or editing of secure documents, and the like.

Such a system and method provide an improvement over traditional authentication techniques by utilizing an electric field of a user to perform liveness detection. Unlike conventional systems that are susceptible to attacks or techniques that are able to fool the liveness detection, the described system and method provides a technique that detects an electric field of a user. Since different objects (e.g., people, animals, devices, etc.) result in different electric fields and electric field shapes, the described technique is not susceptible to the same attacks as conventional systems. Accordingly, the described system provides an authentication technique that is more secure than conventional techniques. Additionally, since the liveness detection is performed using a component and corresponding electric field sensor, the liveness detection is relatively unobtrusive.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
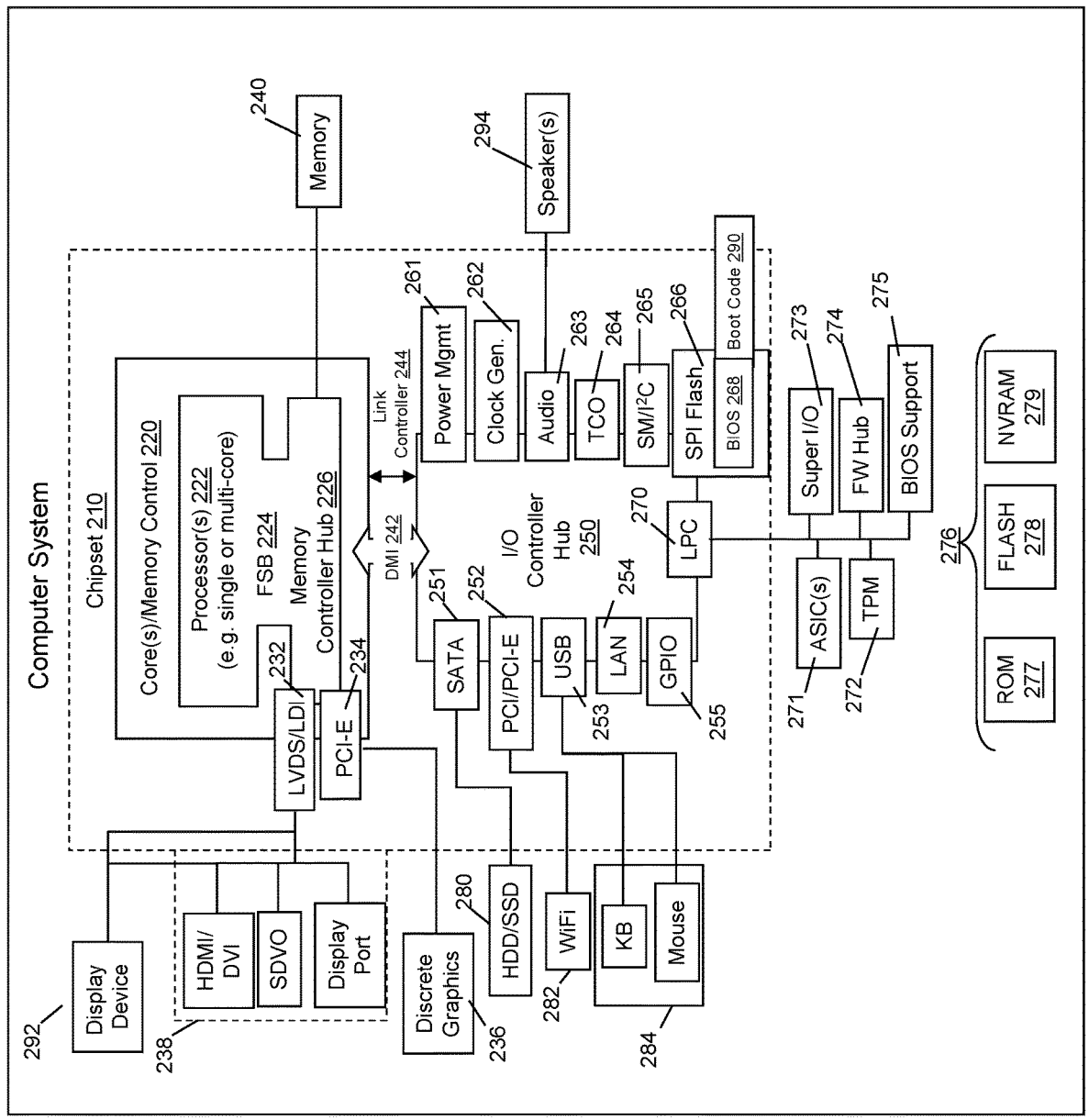
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in a system that can authenticate a user or entity for access to secure information. For example, the circuitry outlined in FIG. 1 may be implemented in a tablet or smart phone embodiment, whereas the circuitry outlined in FIG. 2 may be implemented in a personal computer embodiment.

Figure 3:
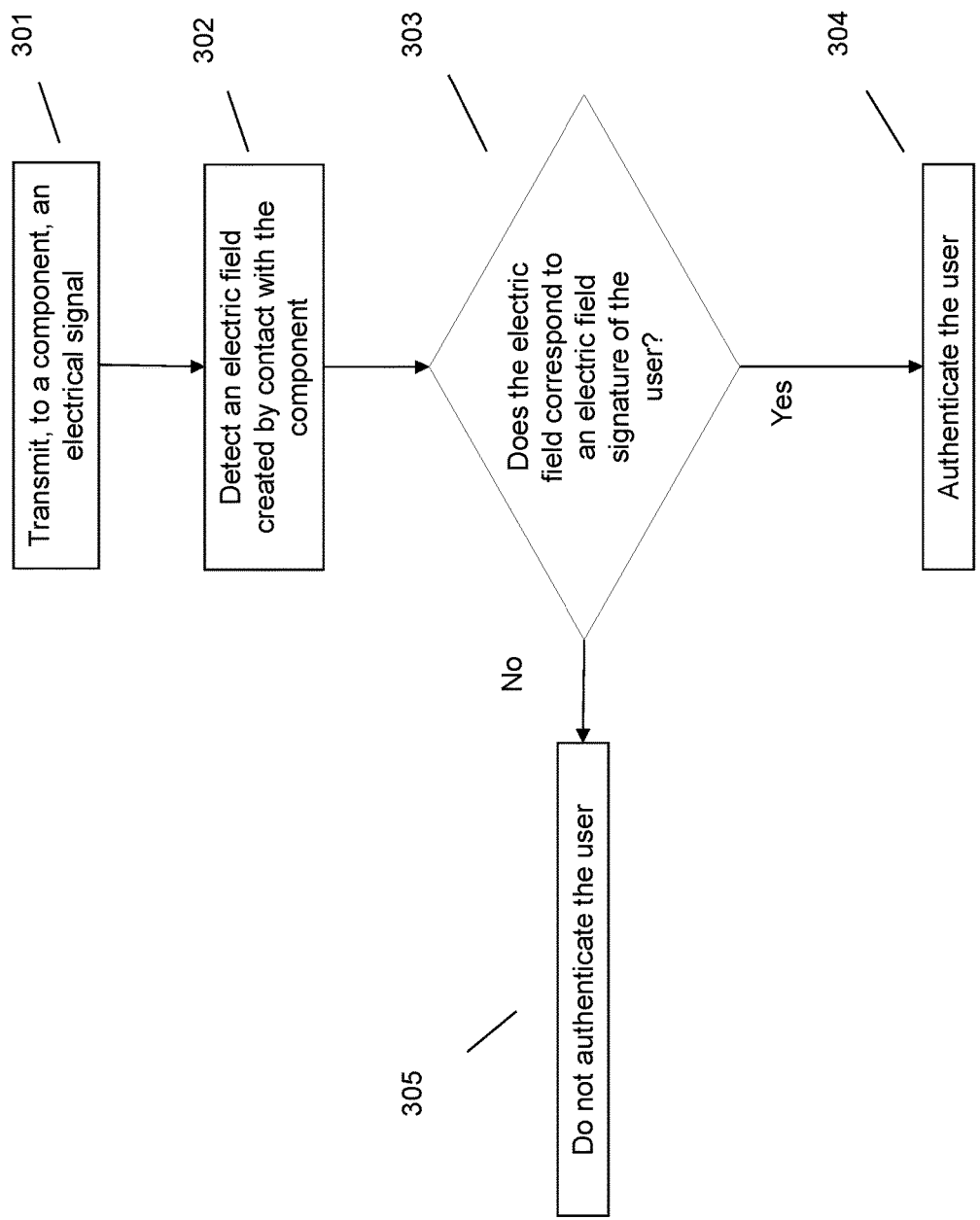
FIG. 3 illustrates an example method for authenticating a user via liveness detection utilizing a detected electric field.

FIG. 3 illustrates an example method for authenticating a user via liveness detection utilizing a detected electric field. The method may be implemented on a system which includes a processor, memory device, output devices (e.g., display device, etc.), input devices (e.g., a detection component, keyboard, touch screen, mouse, microphones, sensors, biometric scanners, etc.), and/or other components, for example, those discussed in connection with FIG. 1 and/or FIG. 2. While the system may include known hardware and software components and/or hardware and software components developed in the future, the system itself is specifically programmed to perform the functions as described herein to authenticate a user by use of a liveness detection system that detects an electric field of a user.

The liveness detection system may run in the background of an information handling device and may be activated when the device is activated. Additionally, or alternatively, the system may be activated when software (e.g., application, website, database, etc.) or other information requiring authorization or that provides authentication or authorization is activated, detected, or otherwise opened. The liveness detection system may also be activated upon receiving input data at the information handling device associated with information containing restricted access. In this case, the liveness detection system may not be activated until at least a portion of input data is received. For example, the liveness detection system may be activated upon detection that an authenticated session is being activated or may be activated after the authentication session has been started. In the first case, the liveness detection system may be used as a technique for initially authenticating the user to initiate an authenticated session, either as the only technique for authenticating the user or in combination with other authentication techniques. In the second case, the liveness detection system may be used as a technique to authenticate the user during an authenticated session, for example, in a continuous authenticated session mode, a periodic authenticated session mode, and/or the like. The liveness detection system may also be used for the initial authentication and authentication occurring during the authenticated session.

Once the liveness detection system is activated on a device, the system may be utilized throughout the described process. Continued use of the liveness detection system in detecting electric fields and determining user signatures will train the device in producing an accurate authentication of the user as a live person. The liveness detection system may utilize one or more artificial intelligence models in detecting an electric field and determining the electric field corresponds to a human and, in some cases, determining the human to which the electric field belongs. For ease of readability, the majority of the description will refer to a single artificial intelligence model. However, it should be noted that an ensemble of artificial intelligence models or multiple artificial intelligence models may be utilized. Additionally, the term artificial intelligence model within this application encompasses neural networks, machine-learning models, deep learning models, artificial intelligence models or systems, and/or any other type of computer learning algorithm or artificial intelligence model that may be currently utilized or created in the future.

The artificial intelligence model may be a pre-trained model that is fine-tuned for the liveness detection system or may be a model that is created from scratch. Since the liveness detection system is used in conjunction with electric field detection and analysis of the electric field, some models that may be utilized by the system are image analysis and/or image classification models because the electric field can be represented as a type of image, electromagnetic feed estimation models, magnetic and electric field assessment or prediction models, and/or the like. The model may be trained using one or more training datasets. Additionally, as the model is deployed, it may receive feedback to become more accurate over time. The feedback may be automatically ingested by the model as it is deployed. For example, as the model is used to identify electric fields and whether the electric fields correspond to a human or specific human, if a user modifies the identification or prediction of the model or otherwise provides some indication that the identification and assessment of the model may be incorrect, the model ingests this feedback to refine the model. On the other hand, as the model identifies electric fields and whether the electric fields correspond to a human or specific human, and no changes are made to the identification and assessment, the model may utilize this as feedback to further refine the model. Training the model may be performed in one of any number of ways including, but not limited to, supervised learning, unsupervised learning, semi-supervised learning, training/validation/testing learning, and/or the like.

As previously mentioned, an ensemble of models or multiple models may also be utilized. Some example models that may be utilized are variational autoencoders, generative adversarial networks, recurrent neural network, convolutional neural network, deep neural network, autoencoders, random forest, decision tree, gradient boosting machine, extreme gradient boosting, multimodal machine learning, unsupervised learning models, deep learning models, transformer models, inference models, feed-forward neural networks, cascade-forward neural networks, Naïve Bayes algorithms, linear support vector machines, and/or the like, including models that may be developed in the future. The chosen model structure may be dependent on the particular task that will be performed with that model.

The artificial intelligence model can be trained utilizing previously supplied user signatures and associated electric fields, and with each newly detected electric field. In other words, the artificial intelligence model is given access to previously determined user signatures and electric fields, and authorizations granted based upon electric field data received. Additionally, the artificial intelligence model receives previously utilized electric field signatures of a user associated with authorization levels to further train the artificial intelligence model. These established electric fields and determined authentications statuses are referred to as a training dataset.

Using the training dataset, which may change over time, the artificial intelligence model learns nuances between electric fields of users and electric fields of objects, and their associated authentication levels. This results in more accurately determining an electric field signature of a user. As electric fields are determined, the machine-learning model can learn additional nuances and become more accurate and refined over time. Thus, while there is an initial training dataset that is used to initially train the artificial intelligence model, the artificial intelligence model is learning over time based upon new information received by the artificial intelligence model, thereby evolving to become more accurate.

An information handling device in combination with a liveness detection system may determine, from a detected electric field of a user, that the electric field corresponds to a signature of a user. Upon this determination, the system may authenticate a user and allow access to the information or system that is protected by the authentication requirement. At 301, the system may transmit, to a component of a liveness detection system, an electrical signal. The liveness detection system may include an electrically conductive component. This electrically conductive component may supply current to an external source upon contact. Thus, the electrically conductive component may be of a material that allows for the conduction of current. While the description focuses on supply of current to the electrically conductive component, it should be noted that other electrical signals may also, or alternatively, be supplied to the electrically conductive component, for example, voltage, power, and/or the like. It should also be noted that while an electrical signal is supplied the electrically conductive component, the liveness detection system may include or use other components to create the electrical signal. For example, in the case that current is supplied to the electrically conductive component, the liveness detection system may utilize or include a battery or other power supply that supplies voltage that creates current through electrical principles. Thus, the liveness detection system may include other electrical signal generation components for generating the electrical signal for the electrically conductive component.

The electrically conductive component may be any type of material or structure that allows for electrical conductivity, for example, a metal plate, electrically conductive fiber, electrically conductive paint, electrically conductive epoxy, and/or the like, or a combination thereof. Additionally, or alternatively, the component may include conductive portions and non-conductive portions. For example, in a system that may utilize a metal plate as the component, the metal plate may be a small piece of metal surrounded by non-conductive components or materials. In this case, when the electrical signal is supplied to the conductive component, only the conductive portion of the component e.g., the metal plate, is charged or receives the signal. For ease of readability, the example of a metal plate will be used. However, this is a non-limiting example.

In the system, the component may be located in a designated area and the size of the component may vary depending on the application or use of the system. As previously mentioned, the electrically conductive component can vary in material, and may also vary in size, location, and/or the like. The size of the electrically conductive component may be very small, such as millimeters in width, length, and height, or may be very large, for example, sized in feet or even larger. The location of the electrically conductive component may also vary and may be based upon a location that would be easily accessed by a user or a location that is unobtrusive to a user. For example, the detection component may be a small metal plate located on the side of a liveness detection system or a touch pad of the liveness detection system and that is intended to be touched by a human hand and/or finger. As another example, the detection component may be a larger metal plate located on the ground a predetermined distance from the liveness detection system intended to be stood on by a user or a location where a user may put their feet when accessing an information handling device. As a final, non-limiting example, the detection component may be a metal plate located on a handle, or may be the entire handle, and coupled to the liveness detection system that is intended to be grabbed by the user. The system may also include multiple electrically conductive components of varying sizes and/or locations. As should be understood, other locations and/or sizes are contemplated and possible and these examples are intended for exemplary system orientations and are non-limiting examples.

When transmitting, at 301, an electrical signal to the electrically conductive component of the liveness detection system, the system may recognize that a user has approached the system. Upon detection of a user being within a predetermined range of the liveness detection system, the system may provide instructions to a user to contact the component. When providing the instructions, the liveness detection system may utilize one or more output components. An output component, for example, may be a display, a speaker, a collection of one or more lights indicating a location, and/or the like. The instructions may not only identify that a user should touch or otherwise contact the electrically conductive component, but may also provide instructions on how to contact the electrically conductive component in order to be authenticated. The instructions may also identify a duration that the user needs to be in contact with the electrically conductive component, for example, by identifying a specific duration of contact, by identifying when the user can release contact with the component, and/or the like.

Once the system has transmitted an electrical signal to a component of a liveness detection system, at 301, the system may then detect an electric field created by contact with the component, at 302. Detection of the electric field may be performed using a detection component of the liveness detection system. The detection component is one that can detect electric fields that are generated by people, animals, and/or contact with the electrically conductive component of the liveness detection system. The detection of the electric field can be performed using a non-contact electric field sensor. Other sensors for detecting an electric field include electric field sensors that require contact with the user, proximity sensors, electric field image capture devices, optical electric field sensors, photoelectric sensors, and/or the like.

Upon a user (or other object) contacting the electrically conductive component of the liveness detection system, the system may detect, at 302, an electric field created by contact with the component. The liveness detection system may only detect the electric field after it has detected that an object has contacted the electrically conductive component. However, since a user, or other living thing (e.g., animal, etc.) has an idle electric field that is present at all times, the liveness detection system may detect a living persons electric field at idle (or before contacting the detection component) and when receiving current (when contacting the detection component). In this example, when a user is within a predetermined range of the liveness detection system or specifically the detection component, the idle electric field of the user may be detected. The idle electric field may act as a baseline for a user for determining a user signature, as will be discussed when referencing 303. The idle electric field may also provide an initial shape of the electric field to the system. Since all objects have an electric field of some type emitting in directions consistent with a shape of the object, an idle electric field for a human will be a different, unique shape in comparison to a non-human object, for example, a tablet, a speaker, and/or any additional objects that may be used in an attempt to dupe an authentication system.

Upon receiving the electrical signal transmitted, at 301, to a user in contact with the electrically conductive component, the electric field of the user may transition from an idle electric field to a charged electric field. When charging an electric field of the user, a minimal, nearly-negligible amount of current may be supplied to a user upon contacting the electrically conductive component. A unique user electric field may then be amplified from the idle electric field of the user. The liveness detection system may then identify a difference in the idle electric field created by contact with the component. In other words, the system may determine an amount of change between an idle electric field and an amplified electric field of the user caused by contact with the component. This change in the electric fields for a user may be unique for each user but may be an expected change between the electric fields.

The detected electric field, whether detected as a new electric field or change in an electric field may have a particular shape. Specifically, the electrical signal causes a field which follows the shape of the object which is in contact with the electrically conductive component. These shapes may be saved as signatures for different objects and/or users. In some cases, these signatures may be unique enough that it can be associated with a specific user and upon detection of that signature, the system can authenticate the user as a specific user. In other cases, the signature may be a general signature that can be used to identify that the object is of a particular type (e.g., device, human, animal, etc.). The signature may also be generally unique, meaning that certain characteristics of the object can be identified from the signature, but it is not specific enough to identify a specific object. For example, a size of the electric field may be associated with a signature that identifies a difference between a child and adult. As another example, a shape of the electric field may be associated with a signature that identifies a difference between a human and an animal. As a final, non-limiting example, the shape of the electric field may be associated with a signature that identifies a prominent feature of an individual.

The liveness detection system may, at 303, determine if an electric field corresponds to an electric field signature of a user. In the system, when it is determined that the electric field signature of a user does not correspond to the electric field of a user, the liveness detection system, at 305, may not authenticate a user. In failing to authenticate the user, at 305, the system may prevent the user from accessing information requiring authorization, may prevent the user from accessing security locations, disable an ability to perform a task, terminate a current authenticated session, and/or the like. In the system, when a user does not gain authentication, the liveness detection system may log a failed attempt and may store the associated electric field. These failed authentication-attempt electric fields may then be referenced when making future decisions, and/or may further train an artificial intelligence portion of the liveness detection system to assist with more accurately determining user electric fields from non-human electric fields.

In the system, when the system determining that an electric field does correspond to an electric field signature of the user, at 303, the liveness detection system may determine that the change in idle electric field detected, at 302, includes an expected change in the electric field of the user. This expected change in the electric field is the signature of the user. As mentioned previously, the electric field of each user may be unique to the user in multiple ways, for example, a shape of the electric field of the user. Therefore, a signature of the user is unique enough to identify and determine an expected change in the electric field for the specific user, while also being consistent enough across all amplified electric fields to determine that the electric field of a user when contacting a detection component of the liveness detection system is indeed associated with a human. For example, a charged human electric field for all humans will look different than the electric field of a display device (e.g., a tablet, smart phone, etc.).

When determining, at 303, if the electric field corresponds to an electric field signature of the user, the system may identify matches between the electric field detected and stored electric field signatures. In the system, all electric fields that pass the liveness detection system may be stored, including, but not limited to, idle electric fields, authenticated electric fields, non-authenticated electric fields, and/or the like. Additionally, or alternatively, the system may only store idle and authenticated electric fields. If a detected electric field is not a predetermined or an expected electric field, the liveness detection system may determine that the present electric field does not correspond to an electric field signature of a user.

To determine if the detected electric field corresponds to an electric field signature of a user, the liveness detection system may identify a shape of the electric field. The system may then match the detected shape of an electric field to an authenticatable electric field shape, for example, as an electric field shape corresponding to a human. Additionally, or alternatively, when determining matches between detected electric fields, the system may determine that a detected electric field of a user is a known authorized electric field. In the system, a known authorized electric field may be a predetermined electric field that corresponds to an authorized user or electric field shape. In the system, a known authorized electric field may be an electric field that is learned and stored over time.

Additionally, when determining if the electric field corresponds to an electric field signature of the user, at 303, the system determine if the electric field is detected within a predetermined range from the detection component. A positive authentication may require that the electric field is within the predetermined range. As mentioned previously, a detection component of the liveness detection system may be located a plurality of locations. In addition, because of a system's ability to detect an electric field at a variety of locations, determining a presence of an electric field signature of a user within a predetermined distance may provide additional accuracy and increased security. Rather than accounting for all electric fields that may be present surrounding a liveness detection system, the system may measure an electric field within a predetermined range and/or in a specified location. If a system were to accept and weigh all electric fields surrounding a detection component, the system may become unintendingly compromised because of an overload of present electric fields (all objects have an electric field). Thus, defining a predetermined range from a detection component for detecting an electric field, at 302, and thereafter, determining the presence of a corresponding electric field signature, at 303, may provide a system that can more accurately determine a presence of an electric field.

After determining that the electric field does correspond to an electric field signature of a user, at 303, the system may authenticate the user, at 304. Authenticating the user may permit a user to access information, locations, and/or the like, that may be protected. In other words, a user will be allowed to access information requiring authorization. Authenticating the user may also include continuing to allow access to information the user is currently accessing, for example, during an authenticated session. In the system, an electric field signature of a user may be enough to authenticate a user. The system may determine the user signature from the change in the idle of electric after contacting the detection component. The liveness detection system may be used to begin or establish an authentication session, may be used to continue an authentication session, and/or the like, or a combination thereof.

Additionally, or alternatively, the system may request additional authorization data from a user prior to authenticating a user, at 304. In this example, additional authorization data may include biometric data, knowledge-based data, skill-based data, and/or the like. In the system, biometric data may include, but is not limited to, a user fingerprint, a user retinal scan, a user pulse detection, and the like. Depending on the additional authorization biometric data required by the system, the system may include the appropriate accompanying sensor for detecting such additional data. In the system, knowledge-based data may include, for example, providing answers to a prompt associated with data a user is attempting to access via authentication or providing answers to questions only the user may know. For example, the system may ask for the exact title of a piece of data, an outlined number of contributors of the desired information, personal information that can be gleaned from an account of the user, and/or the like. In the system, skill-based data may include, for example, a user completing a challenge prior to authentication. For example, the system may ask a user to complete a puzzle, identify a missing piece, identifying a pattern, and/or the like. Similar to the sensors for an accompanying biometric measurement, the system may include the required additional components in order to complete such additional authorization tasks, for example, a display, a keyboard, a mouse, and/or the like.

After authenticating a user, at 304, the system may discharge the electric field. In the system, the electric field of the user produced upon contacting the electrically conductive component and/or being within a predetermined range of the electrically conductive component, may be reversed by stopping transmission of the electrical signal to the user. Additionally, or alternatively, a reverse electrical signal may be transmitted through the electrically conductive component. Stopping transmission or reversing the electrical signal of the electrically conductive component results in the electric field of the user to regress back to an idle electric field. Additionally, or alternatively, in the system, when additional authorization data is requested by the system, the electric field of the user providing additional authorization will remain charged until a user is authenticated, or not authenticated.

In the subsequent paragraphs, example embodiments of how this system and method may be utilized in combination with additional authentication methods are described. These examples are not intended to be limiting, but rather provide insight as to how the use of a liveness detection system may further benefit traditional authentication methods.

When a system requires the use of an authentication method, commonly, a user is required to manually input data into a system. Manually inputting data may include simple inputs such as a passcode, a password, user identification information, and/or the like. In other words, a user is tasked with inputting user identification or credential information (e.g., a traditional username and password prompt). Unfortunately, such authentication methods can be compromised using technology commonly found in the society today. For example, a user's credentials may be collected via imagery techniques (e.g., using a camera to capture inputs as they are being input), may be collected by use of a bot installed in a piece a software, and/or the like. Then, after a user's information is collected, inputting such information back into the system by an unauthorized actor, when this use of user credentials is the only line of security defense, can be performed quick and easily. However, if such a user credential authorization system is used in combination with the use of the liveness detection system and the measuring of electric field signatures of a user, even after user credential information is collected, a hacker attempting to access data with a user's credentials will fail to be initially or continuously authenticated. Upon detection of an electrical field that does not correspond to a human or a specific human, even after user credentials are inputted, a system may determine that that access to information requiring authorization is denied.

Additionally, in another example, a system that requires biometric inputs for authorizing a user may benefit from utilizing a liveness detection system. Similar to the previous example and touched upon earlier, biometric input may be duped by use of technology readily available in society. For example, if a biometric input requires a face scan that matches anomalies of a user's face to a stored image of the face, devices with displays (e.g., tablets, smart phones, etc.) may provide an image of a user to an image capturing device, and may authorize a user. In another example, if a biometric input requires a user to recite a password, devices with recording and audio output features may be used to provide a recorded version of the password to the authorizing system. If such biometric authorization systems utilized a liveness detection system in combination with their traditional security setups, the liveness detection system may determine if a human is providing the biometric input as opposed to a device. Further, a liveness detection system may determine the electric field of a tablet, a recording device, and the like, is not the same as a human, concluding that the user is not providing the biometric input.

As another example, a liveness detection system may be utilized as continuous authentication method. In a system, a user accessing information, a location, and/or the like, that requires authorization, may require continuous authentication while accessing such information. Commonly, continuous authorization methods are applied when a higher security level is required, though this is non-limiting. Upon gaining access to information, locations, and/or the like requiring authorization, in order to ascertain that a user is authorized to access such information, a system may require a user provide inputs at predetermined intervals, require the wearing of a trackable device, and/or the like. In the system, proving inputs at predetermined intervals may include confirming user identity in response to a notification, routinely entering a password/passcode, and/or the like. In the system, wearing a trackable device requires a user to be within parameters surrounding the wearing of a device while operable. Rather than requiring a user to provide inputs and/or wearing a designated trackable device, utilizing a liveness detection system that may measure an electric field of a user at predetermined intervals, continuously while accessing information, and/or the like, will increase security and decrease interruptions while using a continuous authorization method.

The various embodiments herein thus describe a technical improvement over conventional methods for authenticating a user prior to and/or while accessing information, locations, and the like, requiring authorization. Rather than requiring user inputs (e.g., manual inputs, biometric inputs, etc.), the system may utilize a liveness detection system and a detection component to determine a user signature based upon a user electric field. Since an electric field is human specific and unique, the system provides an improved method for accurately determining who, and potentially what, is attempting to access secure information and locations. Subsequent to determining that an electric field detected is in fact a signature of a user, a liveness detection system may authenticate a user.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
transmitting, to a component of a liveness detection system, an electrical signal;
detecting, using a detection component of the liveness detection system, an electric field of a user and created upon the user contacting the component, wherein the electric field has a particular shape corresponding to a shape of the user;
determining, using the liveness detection system, that the electric field corresponds to an electric field signature of the user; and
authenticating, based upon the determining, the user.

2. The method of claim 1, wherein the detecting comprises an idle electric field present without contact with the component and wherein the electric field comprises a difference in the idle electric field created by contact with the component.

3. The method of claim 1, wherein the determining comprises identifying the particular shape of the electric field matches a shape of an electric field corresponding to a human.

4. The method of claim 1, wherein the determining comprises comparing the electric field to known electric fields and identifying a match of the electric field to a known authorized electric field.

5. The method of claim 1, wherein the detecting is performed within a predetermined range from the detection component and wherein the determining comprises identifying the electric field is within the predetermined range.

6. The method of claim 1, wherein the authenticating is responsive to receiving additional authorization data and determining the additional authorization data indicates the user is an authorized user.

7. The method of claim 1, comprising providing, using an output component, instructions to a user to contact the component.

8. The method of claim 1, comprising discharging the electric field responsive to authenticating the user.

9. The method of claim 1, wherein the authenticating comprises allowing access to information requiring authorization.

10. The method of claim 1, wherein, responsive to determining the electric field does not correspond to an electric field signature of a user, preventing access to information requiring authorization.

11. A system, the system comprising:
a processor;
a memory device that stores instructions that, when executed by the processor, causes the system to:
transmit, to a component of a liveness detection system, an electrical signal;
detect, using the detection component of the liveness detection system, an electric field of a user and created upon the user contacting the component, wherein the electric field has a particular shape corresponding to a shape of the user;
determine, using the liveness detection system, that the electric field corresponds to an electric field signature of the user; and
authenticate, based upon the determining, the user.

12. The system of claim 11, wherein the detecting comprises detecting an idle electric field present without contact with the component and wherein the electric field comprises a difference in the idle electric field created by contact with the component.

13. The system of claim 11, wherein the determining comprises identifying the particular shape of the electric field matches a shape of an electric field corresponding to a human.

14. The system of claim 11, wherein the determining comprises comparing the electric field to known electric fields and identifying a match of the electric field to a known authorized electric field.

15. The system of claim 11, wherein the detecting is performed within a predetermined range from the detection component and wherein the determining comprises identifying the electric field is within the predetermined range.

16. The system of claim 11, wherein the authenticating is responsive to receiving additional authorization data and determining the additional authorization data indicates the user is an authorized user.

17. The system of claim 11, comprising providing, using an output component, instructions to a user to contact the component.

18. The system of claim 11, comprising discharging the electric field responsive to authenticating the user.

19. The system of claim 11, wherein the authenticating comprises allowing access to information requiring authorization.

20. A product, the product comprising:
a computer-readable storage device that stores executable code that, when executed by a processor, causes the product to:
transmit, to a component of a liveness detection system, an electrical signal;
detect, using a detection component of the liveness detection system, an electric field of a user and created upon the user contacting the component, wherein the electric field has a particular shape corresponding to a shape of the user;
determine, using the liveness detection system, that the electric field corresponds to an electric field signature of a user; and
authenticate, based upon the determining, the user.

* * * * *